(12) United States Patent
Costecalde et al.

(10) Patent No.: US 9,497,144 B2
(45) Date of Patent: Nov. 15, 2016

(54) CONTEXT-BASED STORAGE OF A CONVERSATION OF ONE OR MORE INSTANT MESSAGES AS A RECORD

(71) Applicant: International Business Machines Corporation, Armonk, NY (US)

(72) Inventors: Jean-Marc Costecalde, Irvine, CA (US); Daniel E. Grack, Fountain Valley, CA (US); Arron La, Fountain Valley, CA (US); Lijing E. Lin, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/226,992

(22) Filed: Mar. 27, 2014

(65) Prior Publication Data
US 2015/0281139 A1     Oct. 1, 2015

(51) Int. Cl.
*H04L 12/58*     (2006.01)
*G06F 17/30*     (2006.01)
*H04L 12/18*     (2006.01)

(52) U.S. Cl.
CPC ......... *H04L 51/04* (2013.01); *G06F 17/30011* (2013.01); *G06F 17/30598* (2013.01); *G06F 17/30705* (2013.01); *H04L 12/1831* (2013.01); *H04L 51/22* (2013.01); *H04L 51/16* (2013.01)

(58) Field of Classification Search
CPC ....................................................... H04L 51/04
USPC ......................................................... 709/206
See application file for complete search history.

(56) References Cited

U.S. PATENT DOCUMENTS

| 6,553,365 | B1 |  | 4/2003 | Summerlin et al. |
|---|---|---|---|---|
| 7,190,956 | B2 | * | 3/2007 | Dorenbosch .......... H04L 12/581 455/435.1 |
| 7,937,469 | B2 |  | 5/2011 | Hamada et al. |
| 7,979,398 | B2 |  | 7/2011 | Debie |
| 8,290,916 | B2 |  | 10/2012 | Vu et al. |
| 8,516,114 | B2 |  | 8/2013 | Banavar et al. |
| 9,021,134 | B1 | * | 4/2015 | Patel ................... H04L 67/2823 709/246 |
| 9,100,588 | B1 |  | 8/2015 | Seymour |
| 9,288,276 | B2 | * | 3/2016 | Adamczyk .......... H04L 12/5815 |

(Continued)

OTHER PUBLICATIONS

Merriam-Webster, "buffer", 2015.*

(Continued)

*Primary Examiner* — O. C. Vostal
(74) *Attorney, Agent, or Firm* — Arnold B. Bangali

(57) ABSTRACT

A computer-implemented method for storing a conversation as a record in a records management server is provided. The computer-implemented method comprises, capturing one or more instant messages exchanged among a plurality of participants as a conversation. The computer-implemented method further comprises, storing the conversation as a record in a records management system, in response to a determination that the conversation meets a predetermined criteria.

7 Claims, 9 Drawing Sheets

(56) References Cited

U.S. PATENT DOCUMENTS

| | | | |
|---|---|---|---|
| 2003/0154217 A1 | 8/2003 | Kinno et al. | |
| 2003/0163525 A1* | 8/2003 | Hendriks | G06Q 10/10 709/204 |
| 2005/0004984 A1* | 1/2005 | Simpson | G06Q 40/04 709/205 |
| 2006/0075039 A1* | 4/2006 | Narayanaswami | G06Q 10/107 709/206 |
| 2006/0085374 A1 | 4/2006 | Mayes et al. | |
| 2006/0085515 A1* | 4/2006 | Kurtz | H04L 12/581 709/207 |
| 2006/0089971 A1* | 4/2006 | Wilensky | G06Q 10/107 709/206 |
| 2006/0212518 A1* | 9/2006 | Bailey | H04L 12/581 709/205 |
| 2007/0094337 A1* | 4/2007 | Klassen | H04L 12/581 709/206 |
| 2007/0128899 A1* | 6/2007 | Mayer | G06F 9/4406 439/152 |
| 2008/0046532 A1* | 2/2008 | Caspi | G06Q 10/107 709/207 |
| 2008/0086463 A1 | 4/2008 | DeBie et al. | |
| 2008/0154970 A1 | 6/2008 | DeBie | |
| 2009/0049135 A1* | 2/2009 | O'Sullivan | G06Q 10/107 709/206 |
| 2009/0094536 A1* | 4/2009 | Keohane | G06Q 10/107 715/758 |
| 2009/0192970 A1* | 7/2009 | O'Sullivan | G06F 17/211 706/48 |
| 2009/0222842 A1* | 9/2009 | Narayanan | G06F 9/542 719/328 |
| 2010/0036929 A1* | 2/2010 | Scherpa | G06Q 10/10 709/207 |
| 2010/0180349 A1 | 7/2010 | Koohgoli et al. | |
| 2010/0241507 A1* | 9/2010 | Quinn | G06Q 30/02 705/14.42 |
| 2011/0208821 A1 | 8/2011 | Huynh et al. | |
| 2011/0218995 A1 | 9/2011 | Ayars et al. | |
| 2012/0036132 A1 | 2/2012 | Doyle | |
| 2012/0109955 A1 | 5/2012 | Lahcanski et al. | |
| 2012/0216108 A1 | 8/2012 | Yambal et al. | |
| 2012/0218918 A1 | 8/2012 | Takae et al. | |
| 2012/0233531 A1 | 9/2012 | Ma et al. | |
| 2012/0278093 A1 | 11/2012 | Amundson | |
| 2013/0036344 A1 | 2/2013 | Ahmed et al. | |
| 2013/0110940 A1* | 5/2013 | Pasquero | H04M 1/72552 709/206 |
| 2013/0124508 A1 | 5/2013 | Paris et al. | |
| 2014/0040383 A1* | 2/2014 | Dura | G06F 9/543 709/206 |
| 2014/0122621 A1* | 5/2014 | Feller | G06Q 10/1095 709/206 |
| 2014/0297629 A1 | 10/2014 | Lin | |
| 2014/0297687 A1 | 10/2014 | Lin | |
| 2014/0307537 A1* | 10/2014 | Baer | H04L 65/1016 370/216 |

OTHER PUBLICATIONS

Merriam-Webster, "record", 2016.*
Anonymous; "Client rule based system for prevention of security exploits in instant messaging systems"; An IP.com Prior Art Database Technical Disclosure; http://ip.com/IPCOM/000212134D; Nov. 1, 2011.
Anonymous; "Using context to learn best communication mechanism for contacting an individual"; An IP.com Prior Art Database Technical Disclosure; http://ip.com/IPCOM/000203055D; Jan. 17, 2011.
Pending U.S. Appl. No. 14/536,710, filed Nov. 10, 2014, entitled: "Context-Based Storage of a Conversation of One or More Instant Messages as a Record".
Shahiduzzaman et al., "Portable and Secure Multimedia Data Transfer in Mobile Phones Using Record Management Store (RMS)", 2010 IEEE, pp. 364-367.

* cited by examiner

US 9,497,144 B2

CONTEXT-BASED STORAGE OF A CONVERSATION OF ONE OR MORE INSTANT MESSAGES AS A RECORD

FIELD OF THE INVENTION

The present invention relates generally to records management systems, and more particularly to context based storage of a conversation of one or more instant messages as a record in a records management system.

BACKGROUND

Records management systems (RMS) provide accurate, secure, and reliable maintenance of records. For example, the records are metadata, including, for example, a file that references and contains information about the records. Further, the metadata can be in the form of record properties, such as, email addresses, media type, format, author, or subject.

Further, the RMS utilizes a file plan system to manage and categorize the records across repositories of the RMS. For instance, the file plan system incorporates a category hierarchy which may include a tree structure comprising of record containers, such as, record categories, record folders, and volumes, to define how the records are categorized, based on business needs of an entity of the records. The file Plan may also be designed, based on the business needs of the entity, so that record containers can be assigned with disposition schedules that include event triggers for retaining, or disposing the records.

SUMMARY

An embodiment of the present invention comprises a computer-implemented method. The computer-implemented method comprises a method for capturing one or more instant messages exchanged among a plurality of participants as a conversation, and in response to a determination that the conversation meets a predetermined criteria, storing the conversation as a record in a records management system.

Another embodiment of the present invention comprises a computer system. The computer system comprises one or more processors, one or more computer-readable memories, one or more computer-readable tangible storage devices and program instructions which are stored on at least one of the one or more computer readable tangible storage devices for execution by at least one of the one or more processors via at least one of the one or more computer readable memories. The computer system further comprises program instructions to capture one or more instant messages exchanged among a plurality of participants as a conversation. The computer system further comprises program instructions to store the conversation as a record in a records management system in response to a determination that the conversation meets a predetermined criteria.

Yet another embodiment of the present invention comprises a computer program-product. The computer-program product comprises one or more computer-readable tangible storage devices and program instructions stored on at least one of the one or more computer-readable tangible storage devices. The computer program product further comprises program instructions to capture one or more instant messages exchanged among a plurality of participants as a conversation. The computer program product further comprises program instructions to store the conversation as a record in a records management system in response to a determination that the conversation meets a predetermined criteria.

BRIEF DESCRIPTION OF THE SEVERAL VIEWS OF THE DRAWINGS

Novel characteristics of the invention are set forth in the appended claims. The invention will best understood by reference to the following detailed description of the invention when read in conjunction with the accompanying figures, wherein like reference numerals indicate like components, and:

DETAILED DESCRIPTION

The present invention comprises functionality for capturing one or more instant messages exchanged among a plurality of participants as a conversation and, in response to a determination that the conversation meets a predetermined criteria, the present invention further comprises functionality for storing the conversation as a record in a records management system.

The one or more instant messages can be, one of a text-based instant message, a voice-based instant message, and a video-based instant message that is exchanged between the plurality of participants. For example, the text-based instant message can be a text, or a file that comprises an attachment which is exchanged among the plurality of participants. In addition, at least one of the plurality of participants is a sender, or a receiver of the one or more instant messages. Further, the roles of the plurality of participants as a sender, or a receiver of the one or more instant messages is interchangeable. For example, at least one of the plurality of participants uses one of a computer, a mobile device, and a phone to exchange the one or more instant messages. Further, the predetermined criteria can be a sender, a receiver, or a system defined criteria for storing the conversation as a record in the records management system.

The records management system provides retention and disposal rules for the record. For example, the record is categorized, and managed in accordance with a file plan system of the records management system. The file plan can incorporate a category hierarchy which may include a tree structure comprising of record containers, such as, record categories, record folders and volumes, to define how the record is categorized in the records management system. The file plan may also be designed based on compliance control policies, so that record containers of the record can be assigned with disposition schedules that include event triggers. For instance, an event trigger can be a calendar date, or a projected event so that once the date or event is reached, the record container of the record is ready for disposition.

Figure 1:
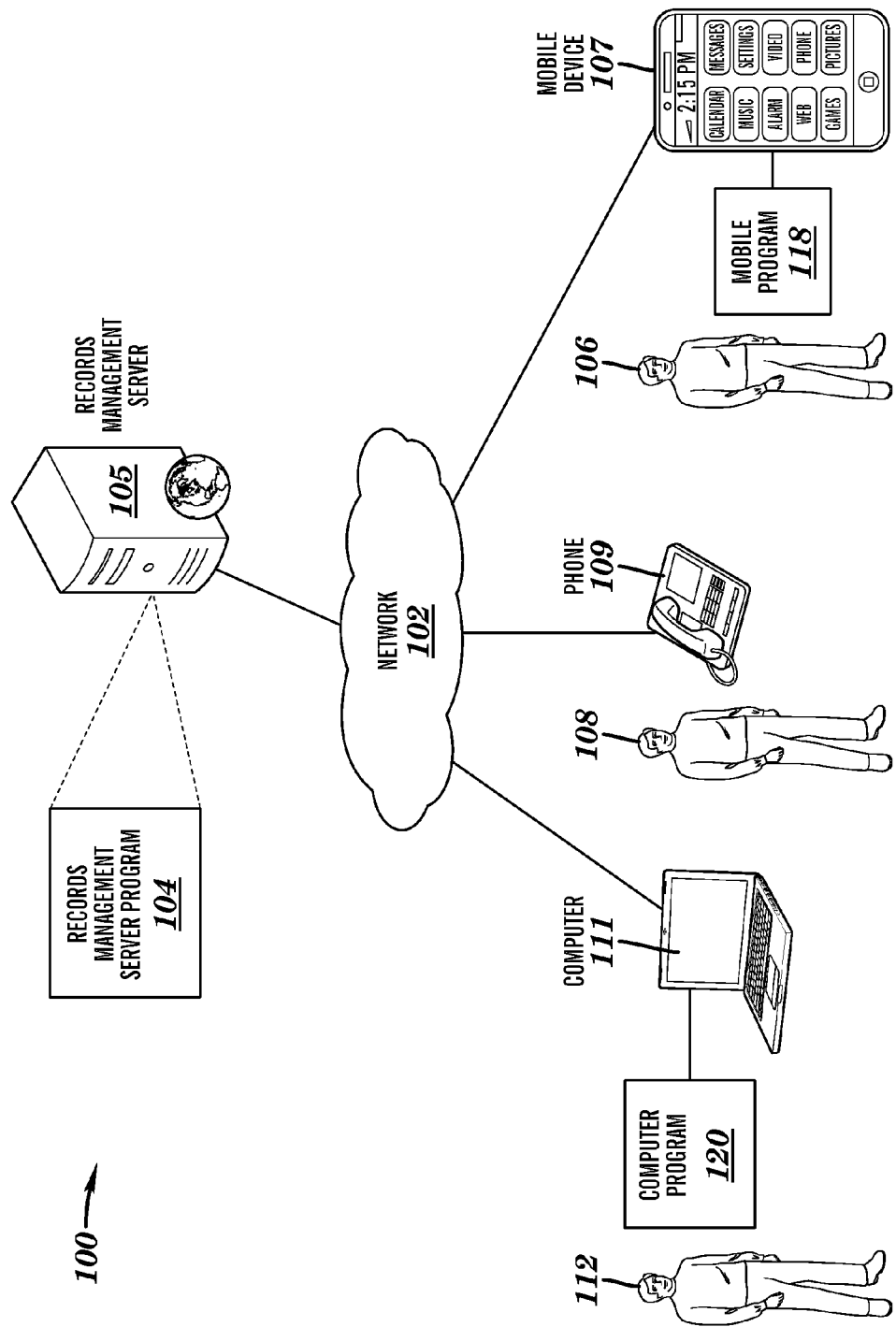
FIG. 1 is a functional block diagram of a conversation storage system for storing a conversation as a record in a records management server, in accordance with embodiments of the present invention.

The present invention will now be described in detail with reference to the accompanying drawings. Referring to FIG. 1, conversation storage system 100 for capturing one or more instant messages exchanged among a plurality of participants as a conversation. Further, in response to a determination that the conversation meets a predetermined criteria, the conversation is stored as a record in a records management system. Conversation storage system 100 comprises mobile device 107, phone 109, computer 111, and records management server 105, all interconnected over network 102.

Mobile device 107 can be any portable device that provides computing and information storage, and retrieval capabilities, including, for example, a handheld device or handheld computer, pocket PC, connected organizer, electronic book (eBook) reader, a personal digital assistant (PDA), or a smart phone, or other portable devices. Mobile device 107 comprises mobile program 118. Mobile program 118 provides instant messaging service, short message servicing (SMS), or other mobile device services, including, for example, a text-based instant message service, a voice-based instant message service, and a video-based instant message service for exchanging a text-based instant message, a voice-based instant message, and a video-based instant message among participants 106, 108, and 112 of mobile device 107, phone 109, and computer 111, respectively. Further, as described, the roles of participants 106, 108, and 112 in exchanging a text-based instant message, a voice-based instant message, and a video-based instant message within conversation storage system 100 is interchangeable.

Computer 111 is a laptop, tablet, or notebook personal computer (PC), a desktop computer, a mainframe or mini computer, or a personal digital assistant (PDA). Computer 111 comprises computer program 120. Computer program 120 provides an operating system platform for facilitating transmittal of a text-based instant message, a voice-based instant message, and a video-based instant message, among participants 106, 108, and 112 of mobile device 107, phone 109, and computer 111, respectively. Phone 109 is a land line telephone that uses a signaling medium telephone line, such as, a metal wire, or fiber optic cable, for transmitting a voice based instant message among mobile device 107, phone 109, and computer 111.

Records management server 105 is a server based records management system, including, for example, a web server, or records management server for maintaining records of the transmitted conversations of mobile device 107, phone 109, and computer 111 according to a file plan. The file plan manages storage of the record across object stores, and repositories of records management server 105, based on compliance control policies. The file plan system incorporates a category hierarchy which may include a tree structure comprising of record containers, such as, record categories, record folders and volumes, to define how the stored record is categorized. For example, maintenance of the stored record includes, for instance, storage, timely retention, retrieval, disposition, as well as auditing and access control of the records according to the file plan.

Records management server 105 can also represent a "cloud" of computers interconnected by one or more networks, wherein records management server 105 can be a primary server of a computing system utilizing clustered computers when accessed through network 102. For example, a cloud computing system can be an implementation for capturing one or more instant messages exchanged among mobile device 107, phone 109, and computer 111, as a conversation and, in response to a determination that the conversation meets a predetermined criteria, storing the conversation as a record in records management server 105. Records management server 105 includes records management server program 104. Records management server program 104 stores, retrieves, and disposes of the transmitted conversations of mobile device 107, phone 109, and computer 111.

Network 102 includes one or more networks of any kind that can provide communication links between various devices and computers connected together within conversation storage system 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. For example, conversation storage system 100 can utilize the Internet with network 102 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

Figure 2A:
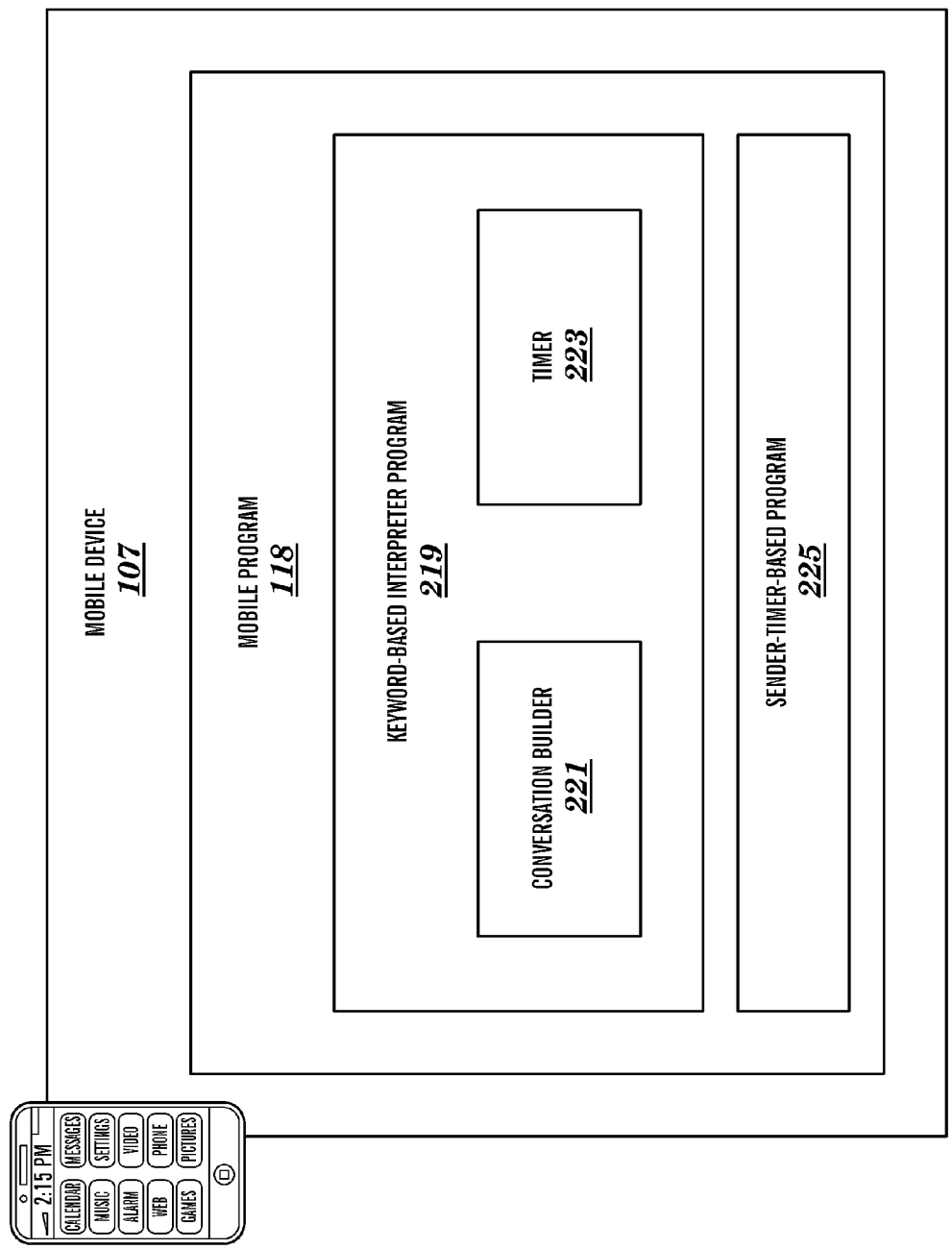
FIG. 2A is functional block diagrams illustrating program components of a mobile program of a mobile device, in accordance with embodiments of the present invention.

FIG. 2A is a functional block diagram illustrating program components of mobile program 118 of mobile devices 107, in accordance with an embodiment of the present invention.

Mobile program 118 captures one or more instant messages exchanged among participants 106, 108, and 112, as a conversation and, in response to a determination that the conversation meets a predetermined criteria, mobile program 118 stores the conversation as a record in records management server 105. According to one embodiment, the predetermined criteria is a context-based criteria for storing the conversation as a record. The context based criteria is one of a sender-based criteria, keyword-based criteria, and a timing-based criteria. The context based criteria can be defined by participants 106, 108, and 112 in mobile program 118 for storing the conversation as a record in records management server 105. The context-based criteria can also be a system defined criteria of mobile program 118 for storing the conversation as a record in records management server 105.

For example, mobile program 118 determines that conversation of the captured one or more instant messages meets the context-based criteria, further, mobile program 118 transmits the conversation to records management server 105, for storing the conversation as a record in records management server 105. For example, once it is determined, by mobile program 118, that the conversation meets the context-based criteria, mobile program 118 transmits the conversation including, but not limited to, the following to records management server program 104, for storage of conversation as a record in records management server 105: message content of the conversation, including for example, message content of text-based instant message, voice-based instant message, and video-based instant message of the conversation; identification of participants 106, 108, and 112 of the one or more instant messages, current location of participants 106, 108, and 112 of the one or more instant messages, and time the one or more instant messages was captured by mobile program 118.

For example, for the first criteria, the sender-based criteria, the criteria for determining whether conversations meets the predetermined criteria to store the conversations as a record, may include, but not limited to, for example, determination of conversations of participants 106, 108, and 112 that are relevant, therefore relevant conversations from participants 106, 108, and 112, are identified for storage as a record in records management server 105. For example, consider sender A of participant 106, identifies business partners B and C of participants 108, 112, for storage of one or more instant messages exchanged between business partners B and C, as a record in records management server 105. In this case, sender A may select to store relevant conversations of one or more instant messages from business partners B's and C's accounts as a record, in records management server 105.

For the second criteria, the keyword based criteria, participants 106, 108, and 112 or system of mobile program 118, can define a list of keywords and/or frequency formulas of the keywords to identify conversations of the one or more instant messages, for storage of the conversations as a record in records management sever 105. For example, according to one embodiment, as soon as the frequency of certain keyword(s) appearing in the one or more instant messages is identified, or detected, mobile program 118 stores the conversation as record in records management server 105. For example, one criteria can be, if certain keyword(s) of identified participants 106, 108, and 112, appears in the one or more instant messages, for example, three times, store conversations of each message from the identified participants 106, 108, and 112 as a record in records management server 105.

The third criteria, the timing based criteria, provides transmission of relevant conversations of one or more instant messages, exchanged between either of participants 106, 108, and 112 to records management server 105, wherein the relevant conversations are transmitted during certain hours, minutes, or time of day the one or more instant messages are exchanged between participants 106, 108, and 112. Further, the fourth criteria of the context based criteria can be a combination of the first, second, and third criteria of the context based criteria, wherein mobile program 118 transmits the one or more instant messages to records management server 105 when conversations are detected based on a combination of occurrence of the first, second, and/or third criteria of the context based criteria of mobile program 118.

Mobile program 118 includes keyword-based interpreter program 219, and sender-timer based program 225. Keyword-based interpreter program 219 groups, locally, in a buffer of mobile device 107, instant messages exchanged between participants 106, 108, and 112, or received by, or sent to participants 106, 108, and 112, to build a conversation buffer of the one or more instant messages. For example, the conversation buffer is created by the first, or initial instant message exchanged between a specific contact of either participants 106, 108, and 112, and ends when no more messages have been exchanged, for a pre-determined time period. Further, when exchange of the one or more instant message ends, and if the buffered conversation satisfies the keyword-based criteria of keyword-based interpreter program 219, the entire buffered conversation is transmitted to records management server program 104 for storage of the buffered conversation in records management server 105. Keyword-based interpreter program 219 includes conversation builder 221 and timer 223.

Conversation builder 221 monitors incoming and outgoing instants messages, exchanged between either of participants 106, 108, and 112 of mobile device 107, and builds a conversation buffer that buffers the exchanged one or more instant messages received from, or sent to a contact of both participants 106, 108, and 112. As described, keyword-based interpreter program 219 interprets the buffered conversation, and determines if the buffered conversation meets the context based criteria for storing the buffered conversation in records management server 105. Timer 223 determines when exchange of incoming and outgoing instants messages, exchanged between either of participants 106, 108, and 112 is terminated, hence, buffering of captured conversation of the one or more instant messages is terminated by conversation builder 221. For example, timer 223 activates, or wakes up regularly, for example, every minute, and verifies if there has been any exchange of one or more instant messages added to the conversation buffer of conversation builder 221.

For example, if no message has been added to the buffered conversation for a predetermined time period, for example, one hour, timer 223 ends conversation buffering of conversation builder 221. Further, unlike keyword-based interpreter program 219 that buffers the one or more instant messages to create a conversation, sender-timer based program 225 stores in records management server 105, conversations of the one or more instant messages, exchanged during a period of time, or from, or to a given contact of participants 106, 108, and 112.

Figure 2B:
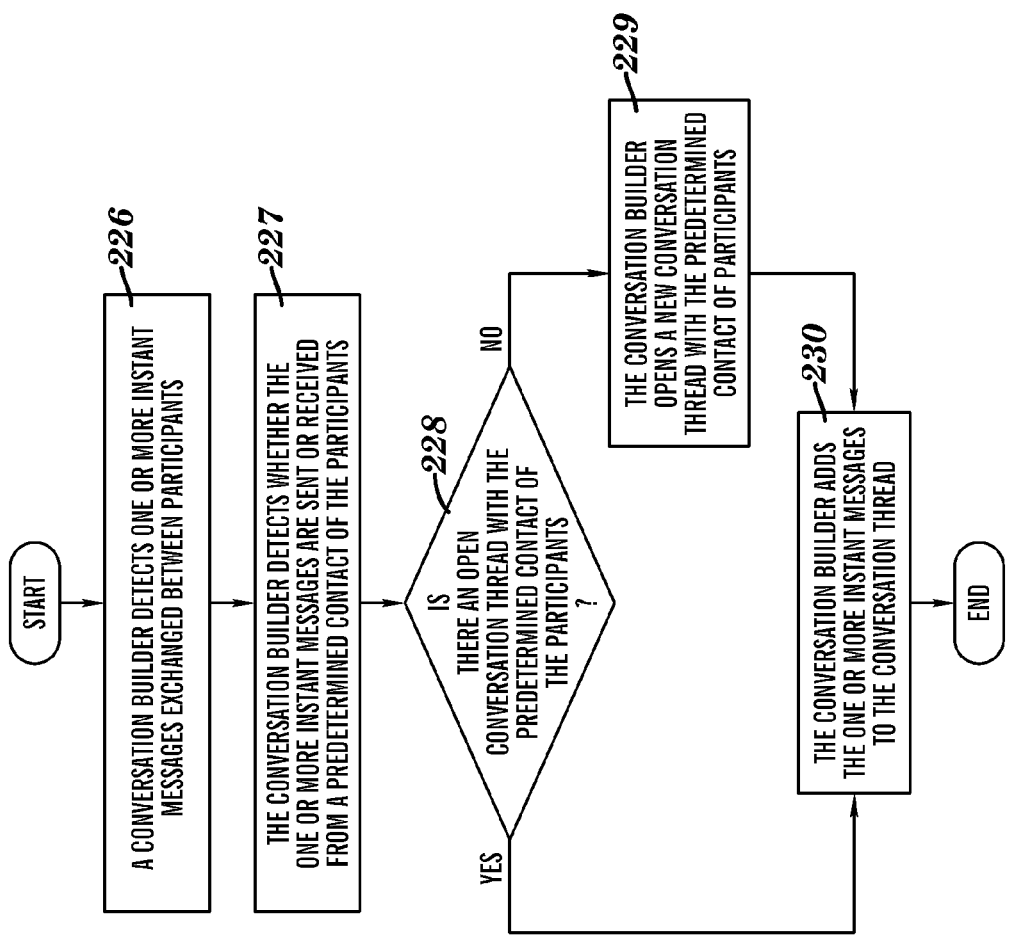
FIGS. 2B-2D are flow diagrams depicting steps performed by a mobile program of a mobile device for storing a conversation as a record in a records management system, in accordance with the present invention.

FIG. 2B is a flow diagram depicting steps performed by conversation builder 221 for monitoring incoming and outgoing instants messages exchanged between participants 106, 108, and 112. Conversation builder 221 builds a conversation buffer that groups the instant messages between participants 106, 108, and 112. Conversation builder 221 detects one or more instant messages exchanged between participants 106, 108, and 112. (Step 226). Conversation builder 221 detects whether the one or more instant messages are sent, or received from a predetermined contact of participants 106, 108, and 112. (Step 227).

Conversation builder 221 determines if there is an open conversation thread with the predetermined contact of participants 106, 108, and 112. (Decision 228). For example, if there is an open conversation with the predetermined contact, at step 230, conversation builder 221 adds the one or more instant messages to the conversation thread, wherein conversation builder 221 buffers the one or more instant messages of the conversation thread to create a conversation. For example, if the created conversation meets the context based criteria for storing the created conversation in records management server 105, the created conversation is stored, as a record, in records management server 105, in accordance with the present invention.

However, if it is determined, at decision 228, that there is no open conversation with the predetermined contact of participants 106, 108, and 112, then, at step 229, conversation builder 221 opens a new conversation thread with the predetermined contact of participants 106, 108, and 112.

Thereafter, at step 230, conversation builder 221 adds the one or more instant messages of the predetermined contact of participants 106, 108, and 112 to the conversation thread, wherein conversation builder 221 buffers the one or more instant messages of the conversation thread to create a conversation.

Figure 2C:
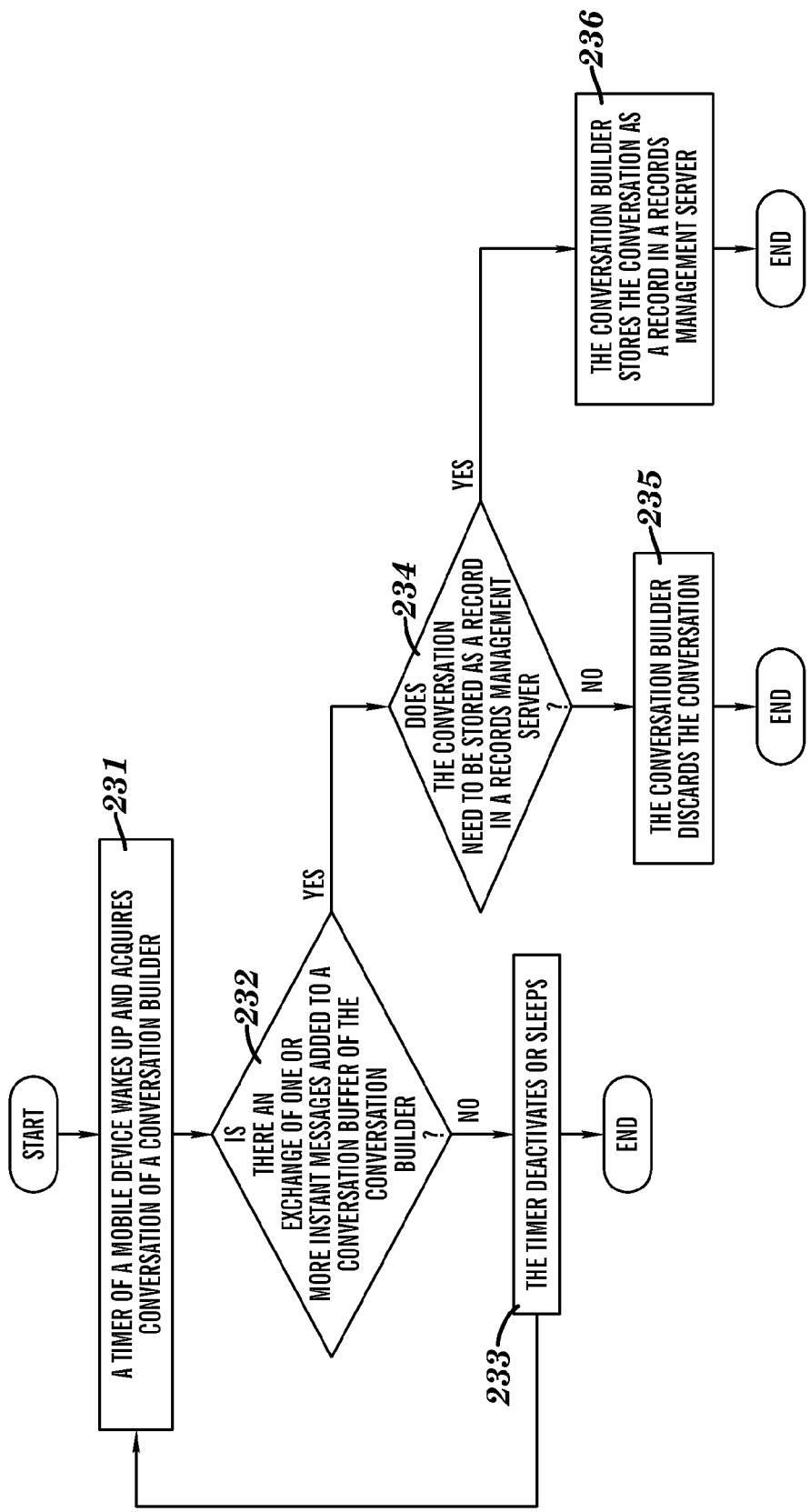

FIG. 2C is a flow diagram depicting steps performed by timer 223 for determining when exchange of incoming and outgoing instants messages, exchanged between participants 106, 108, and 112 is terminated, in accordance with embodiments of the present invention.

Timer 223 wakes up, and acquires conversation of conversation builder 221 for determining when exchange of incoming and outgoing instants messages, exchanged between participants 106, 108, and 112 is terminated. (Step 231). Timer 223 determines if there has been exchange of one or more instant messages between participants 106, 108, and 112, added to a conversation buffer of conversation builder 221. (Decision 232). If timer 223 determines that there is no exchange of one or more instant messages added to the conversation buffer of conversation builder 221, at step 233, timer 223 deactivates, or sleeps.

If there is a conversation added to the conversation buffer of conversation builder 221, then, timer 223, determines, at decision 234, whether the conversation needs to be stored as a record in records management server 105. If the conversation needs to be stored as a record in records management sever 105, then at step 236, conversation builder 221 stores the conversation as a record in records management server 105. However, if timer 223 determines that the conversation does not need to be stored as a record in records management server, then, at step 235, conversation builder 221 discards the conversation.

Figure 2D:
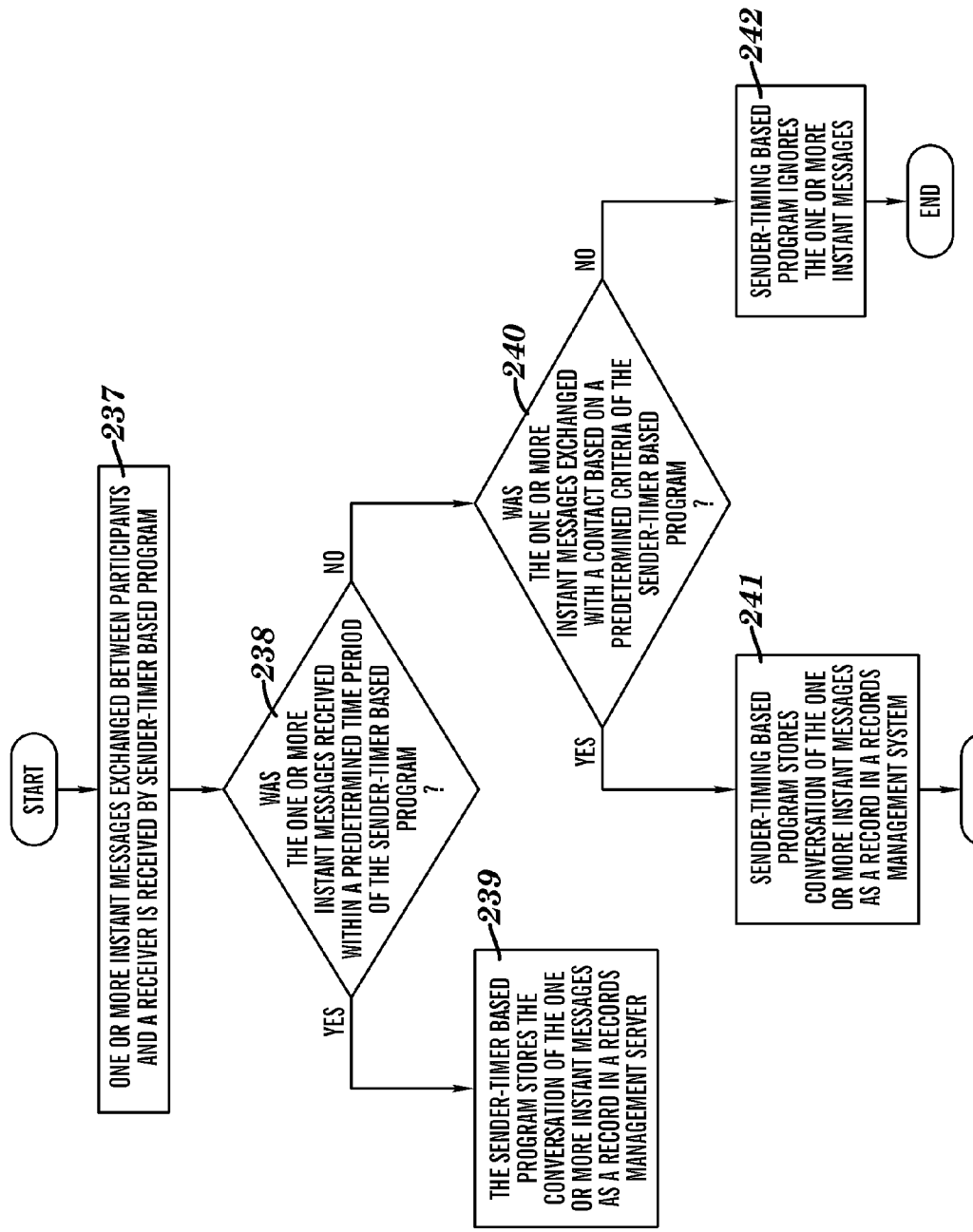

FIG. 2D is a flow diagram depicting steps performed by sender-timer based program 225 for storing in records management server 105, conversations of one or more instant messages, exchanged during a period of time, or from a given contact of participants 106, 108, and 112. For example, one or more instant messages exchanged between participants 106, 108, and 112, are received by sender-timer based program 225. (Step 237). Sender-timer based program 225 determines whether the one or more instant messages was received within a predetermined time period of sender-timer based program 225. (Decision 238).

If the one or more instant messages were received within the predetermined time period of sender-timer based program 225, then, at step 239, sender-timer based program 225 stores the conversation of the one or more instant messages as a record in records management server 105. However, if the one or more instant messages was not received within the predetermined time period of sender-timer based program 225, then at decision 240, sender-timer based program 225 determines whether the one or more instant messages was exchanged with a given contact of participants 106, 108, and 112, based on a predetermined criteria of sender-timer based program 225. If the one or more instant messages exchanged with the given contact of participants 106, 108, and 112 are not based on the predetermined criteria of sender-timer based program 225, then at step, 242, sender-timer based program 225 ignores the one or more instant messages. However, if the one or more instant messages, exchanged with the given contact, was based on the predetermined criteria of sender-timer based program 225, then at step 241, sender-timer based program 225 stores conversation of the one or more instant messages as a record in records management server 105.

Figure 3:
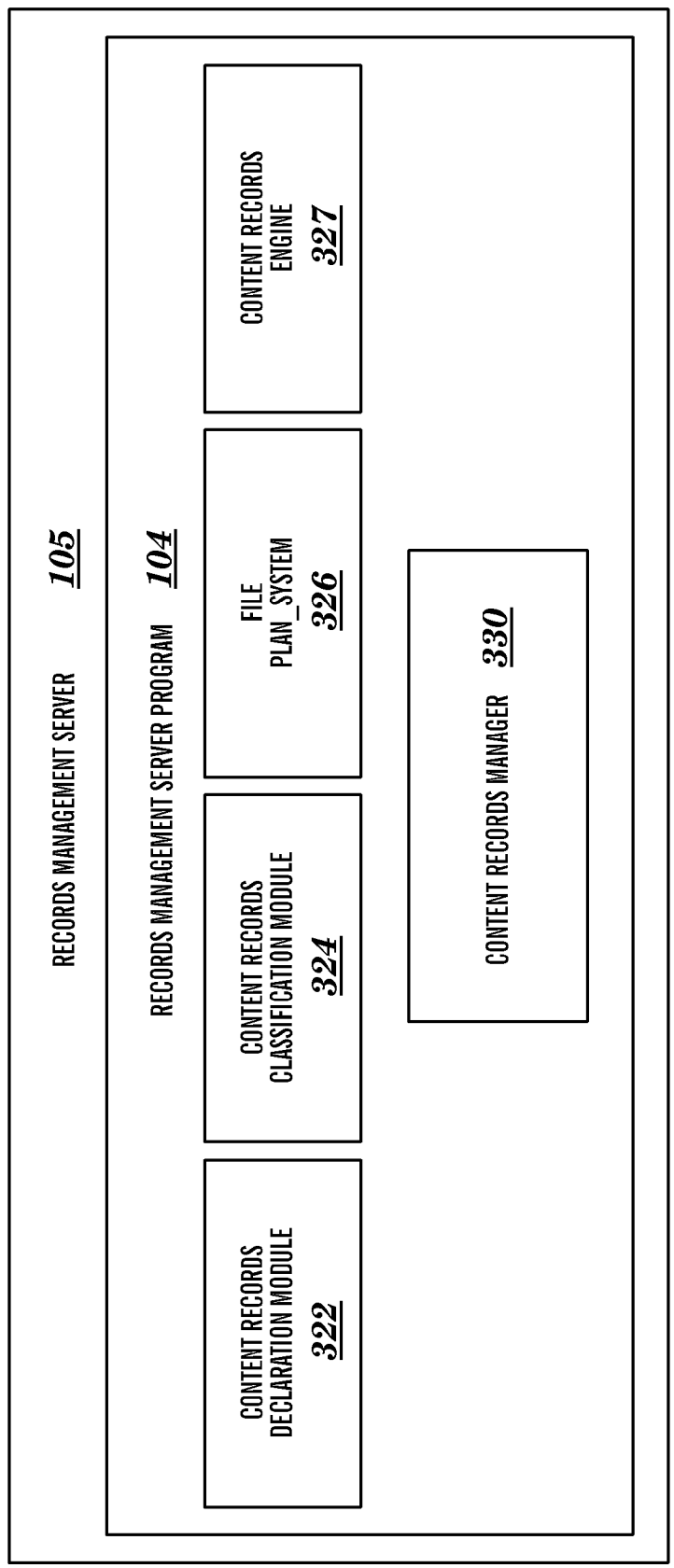
FIG. 3 is a functional block diagram illustrating components of a records management server, in accordance with embodiments of the present invention.

FIG. 3 is a functional block diagram illustrating components of records management server 105, in accordance with embodiments of the present invention.

Records management server program 104 maintains records of conversations according to a file plan, based on compliance control policies to store, retrieve, deposit as well as auditing and access control of a record of records management server 105. Records management server program 104 includes content records declaration module 322, content records classification module 324, file plan system 326, content records engine 327, and content records manager 330. According to at least one embodiment, the record is stored in records management server 105 according to file plan system 326, which may include, for instance, categorizing the record of the file plan system 326, wherein file plan system 326 provides records categories of record, storage for record, audit and access control policies for the record, and/or destruction or preservation of record, based on compliance policies that can be defined in content records manager 330, for storing the record in records management server 105.

For example, one or more file plans 326 of records management server program 104 includes an outline/definition for records management of the stored records based on hierarchically arranged set of categories, records folders, and records volumes of the records. Content objects engine 327 provides the repository server for storing the records of records management server 105 in file plan 326, and is also responsible for enforcing security, and auditing of the record. Content records manager 330 creates, and manages disposition schedules and records folders of file plan system 326, configures records management server program 104 to specify classes of the record.

Figure 4:
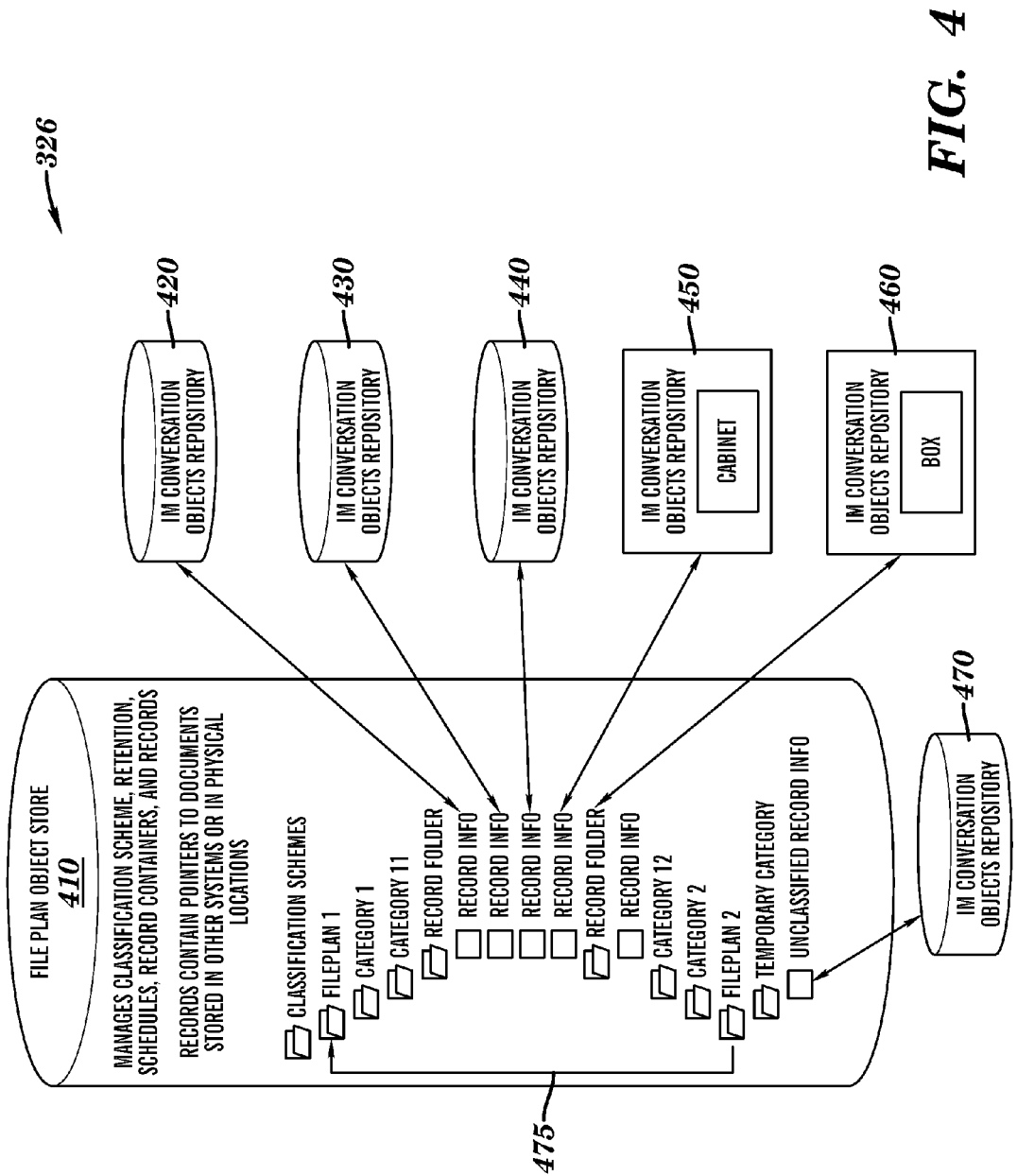
FIG. 4 is a functional block diagram illustrating file plan system model of a records management server program, in accordance with embodiments of the present invention.

FIG. 4 is a functional block diagram illustrating file plan system 326 of records management server program 104, in accordance with embodiments of the present invention. File plan system 326 is used to manage storage of records across object stores and repositories of records management server program 104. File plan system 326 utilizes file plan object store 410 to manage classification schemes, retention schedules, and recording of the records of records management server 105. File plan system 326 also incorporates a category hierarchy which may be the primary classification for the records. More particularly, file plan system 326 may incorporate a classification scheme, record category, record folder, record information, or record type that can be used to manage the records. For example, the category hierarchy may also include a tree structure defining how records are organized, and the category hierarchy may also propagate security and support disposition schedules for the records.

The category hierarchy may include a flexible hierarchical structure that is designed to fit the unique needs of an organization. Furthermore, the category hierarchy of file plan system 326 may determine the scheme for classifying of storage of the records in combination with events or business context so that the records may be automatically classified by a records management server 105, without user intervention.

The category hierarchy may also be determined by business function. For example, a category hierarchy may be organized according to a function/activity/transaction model wherein the first level determines functional groupings, the second level determines activities within the function, and the lowest level represents a transaction.

The hierarchy may also be designed to facilitate access. In this manner, security may be more easily controlled, by an administrator of records management server 105, wherein the administrator can provide maintenance, or compliance policy control of stored records of records management server 105. File plan system 326 may also be designed so that each folder in the category is a client file that contains the client's records, and once the client folder is closed, cutoff may be triggered so that active use of the records ends, and it begins its retention period. In another aspect, file plan system 326 may be designed so that different types of records are filed into different folders. Further, file plan system 326 may be designed so that each subcategory represents a project, and each project may have a collection of folders to manage different records related to the project. An external event related to a project milestone may be used to trigger cutoff so that active use of the record ends, and the retention period begins. The record category may be added to the root of file plan system 326. The record category may also be added as a subcategory to an existing category to establish a hierarchy. The required properties of a category may be the category name which may be descriptive of the category, the category identifier which may be a more cryptic string identifier often containing a numeric code, and a reviewer which may default to the user who is adding the category.

A record folder may be added to a category. The record folder may be the most common level for managing records of records management server 105. The required properties for a folder may include the folder class, such as, a content engine object class defining the type of folder. The folder class may be defined by the data model. The folder properties may also include a name, identifier, and reviewer much like the record category. For example, a record folder may not contain sub-folders, but may contain volumes of records of records management server 105. The first volume may be automatically added when the record folder is created, and a name may be automatically generated based on the folder name. For example, when a new volume is added, the previous volume may be automatically closed. Volumes may be used to partition groups of records, whether similar or not. For example, a record folder may contain all invoices while volumes may be used to partition by month. A volume may be required to include a reviewer, which may default to the user requesting the volume.

As shown in FIG. 4, the data objects and repositories of instant messages (IM) conversation objects repository 420, 430, 440, 450, 460 may be configured in conformance with the classic model of a software object that has been developed in object-oriented programming to include one or more attributes and one or more methods.

A broad variety of characteristics may be assigned as attributes to the file plan object 410. For example, these objects may incorporate attributes that are related to the records that are embodied in the software object, such as, a name for the record, a description of the record, the type of record, an identification of the holders of the record. Audit or compliance policy information may also be contained as an attribute relating to the record, such as, identification of who accesses records of records management server 105. Electronic signatures that may have been procured in connection with an object store such as object store 410. Notifications that should be issued upon a change in an aspect of a data object, security information relating to a data object, status information that is associated with the record (such as lost item), relevant dates (e.g., creation date, expiry date, and/or key timelines, including multiple, periodic or cyclical information), and relationships between the record software object and other components may be contained as attributes. Although each of these characteristics may be illustrated as an attribute of the object, each of these may also or instead be stored as separate components or objects in the record management system. Furthermore, data model of file plan system 326 includes pointers from the file plan object store 410 to documents stored in other systems or locations. One such pointer is to object stores related to IM conversation objects repository 420, 430 which are the main record types and thus use more space. The data model also includes pointers to an image service repository of IM conversation objects repository 440, a cabinet repository for physical documents of IM conversation objects repository 450 that may be located in cabinets, as well as a box repository for physical documents of IM conversation objects repository 460 that may be located in boxes. These records are all classified under one particular file plan of file plan system 326, which may be one of several or many file plans employed by file plan system 326 for storing records of records management server 105.

A second file plan can be used to point to IM conversation objects repository 470 which have been stored as records, but not yet given any record classification under the file plan. Although, shown here in one instance, the records designated in file plan system 326 of repository 470 may be in any of IM conversation objects repository 420, 430, 440, 450, and 460, or elsewhere. The stored conversations may move to another file plan, as indicated by line 475, upon the occurrence of a classification event where, for example, additional information is added to the record, allowing it to be classified into another file plan.

This design provides for a file plan of file plan system 326 that incorporates an intuitive scheme that can be readily used by a records administrator of records management server 105 to generate a file plan. Based on the structure of file plan system 326, the records administrator may customize file plan system 326 to provide storage for the records of records management server 105. File plan 326 also provides maintenance, and compliance policy mechanism for auditing, or accessing the records. Methods may be related to the records, including methods that include or relate to retention and disposition rules, timed events, notifications, reports and trends and forecasts. Each of these methods may constitute software subroutines that initiate, alter or interrupt one or more processes. As with the attributes, the methods may be stored separately from the file plan object store 410 or data objects of records of records management server 105.

Figure 5:
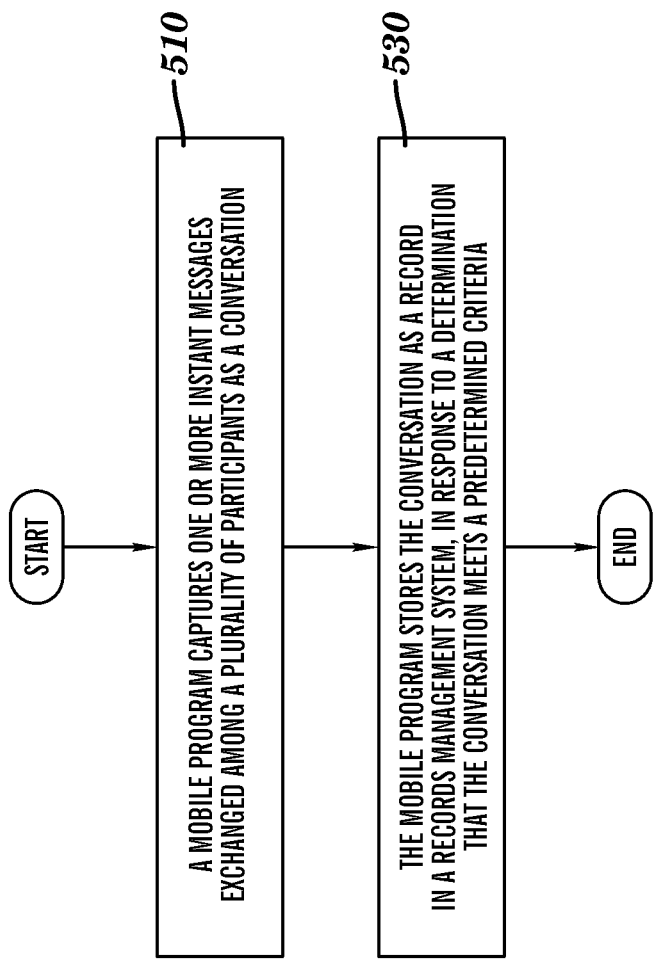
FIG. 5 is a flowchart depicting steps performed by a mobile program for storing a conversation as a record in a records management system, in accordance with embodiments of the present invention.

FIG. 5 is a flowchart depicting step performed by mobile program 118 for storing conversations as a record in a records management server 105, in accordance with the present invention. In step 510, mobile program 118 captures one or more instant messages exchanged among a plurality of participants, including, participants 106, 108, and 112, as a conversation. In step 530, in response to a determination that the conversation meets the context based criteria, mobile program 118 stores the conversation as a record in a records management system including, for example, records management server 105.

For example, as described, mobile program 118 determines whether conversations of the captured one or more instant messages meets the context-based criteria, wherein the context-based criteria includes, for example, a sender based criteria, a timing based criteria, and a keyword based criteria, and if the conversations meet the context-based criteria, mobile program 118 transmits the conversations to records management server 105, for storing the conversation as a record in records management server 105.

Figure 6:
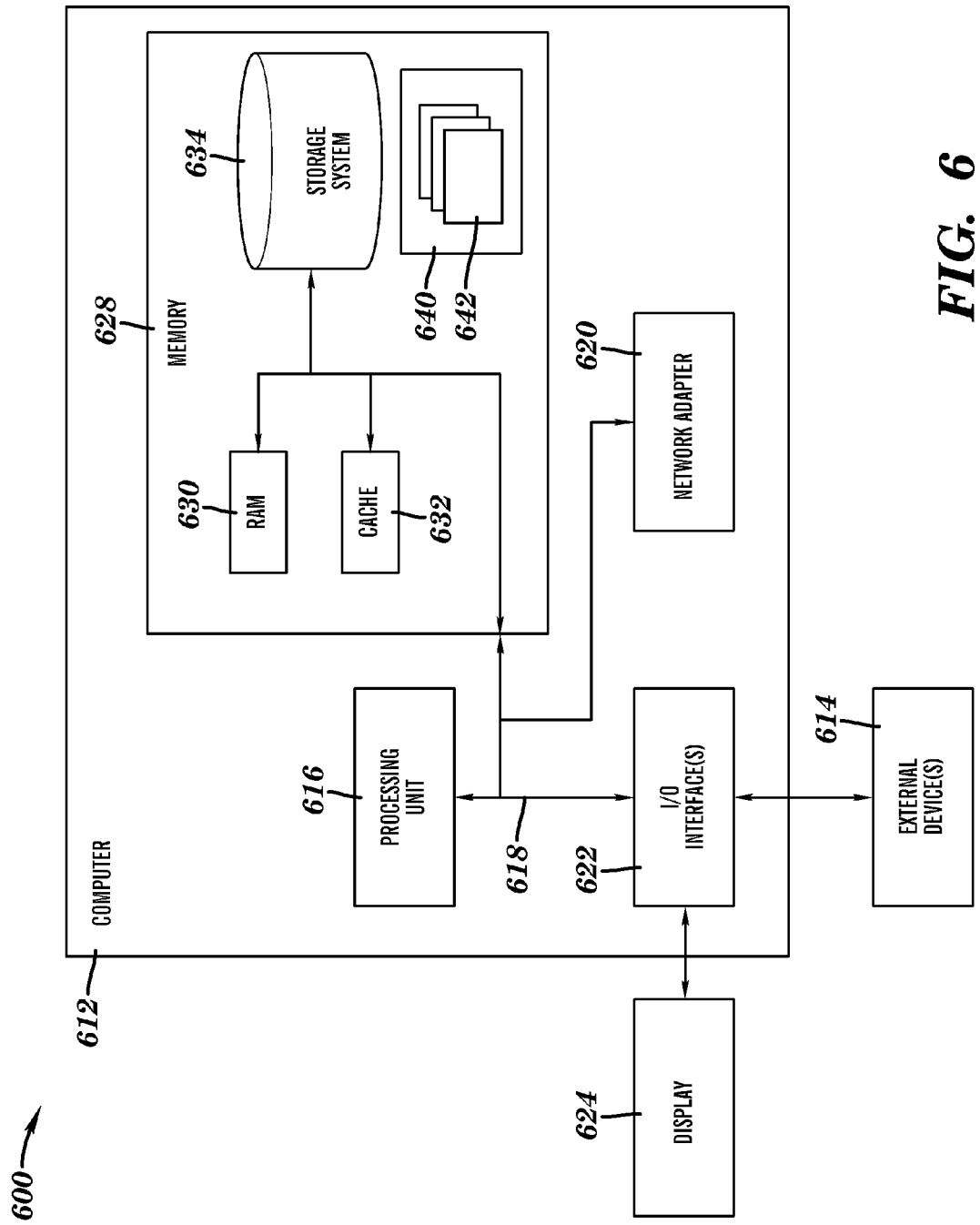
FIG. 6 illustrates a block diagram of components of a computer system, in accordance with embodiments of the present invention.

FIG. 6 is a functional block diagram of a computer system, in accordance with an embodiment of the present invention.

Computer system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In computer system 600 there is computer 612, which is operational with numerous other general purpose or special purpose computing system environments or configurations. Examples of well-known computing systems, environments, and/or configurations that may be suitable for use with computer 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of mobile device 107, phone 109, computer 111, and records management server 105 can include or can be implemented as an instance of computer 612. Computer 612 may be described in the general context of computer system executable instructions, such as program modules, being executed by a computer system. Generally, program modules may include routines, programs, objects, components, logic, data structures, and so on that perform particular tasks or implement particular abstract data types. Computer 612 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 6, computer 612 is shown in the form of a general-purpose computing device. The components of computer 612 may include, but are not limited to, one or more processors or processing units 616, memory 628, and bus 618 that couples various system components including memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 612 typically includes a variety of computer system readable media. Such media may be any available media that is accessible by computer 612, and includes both volatile and non-volatile media, and removable and non-removable media.

Memory 628 includes computer system readable media in the form of volatile memory, such as random access memory (RAM) 630 and/or cache 632. Computer 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Mobile program 118, computer program 120, and records management server program 104 can be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Each one of mobile program 118, computer program 120, and records management server program 104 are implemented as or are an instance of program 640.

Computer 612 may also communicate with one or more external devices 614 such as a keyboard, a pointing device, etc., as well as display 624; one or more devices that enable a user to interact with computer 612; and/or any devices (e.g., network card, modem, etc.) that enable computer 612 to communicate with one or more other computing devices. Such communication occurs via Input/Output (I/O) interfaces 622. Still yet, computer 612 communicates with one or more networks such as a local area network (LAN), a general wide area network (WAN), and/or a public network (e.g., the Internet) via network adapter 620. As depicted, network adapter 620 communicates with the other components of computer 612 via bus 618. It should be understood that although not shown, other hardware and/or software components could be used in conjunction with computer 612. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for capturing one or more instant messages exchanged among a plurality of participants as a conversation and, in response to a determination that the conversation meets a predetermined criteria, storing the conversation as a record in a records management system. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method comprising:
    capturing one or more instant messages exchanged among a plurality of participants as a conversation, wherein a conversation builder captures incoming and outgoing instant messages of the plurality of participants, and builds a conversation buffers for buffering the one or more instant messages; and
    in response to a determination that the buffered conversation meets a predetermined criteria of a context based criteria, storing the conversation as a record in a records management system, wherein the conversation includes message content of text-based instant message, voice-based instant message, and video-based instant message of the conversation, identification of the plurality of participants the one or more instant messages, current location of the plurality of participants of the one or more instant messages, and time the one or more instant messages was captured.

2. The computer-implemented method of claim 1, wherein at least one of the one or more instant messages is one of a text-based instant message, a voice-based instant message, and a video-based instant message.

3. The computer-implemented method of claim 1, wherein at least one of the plurality of participants uses one of a computer, a mobile device, and a phone to exchange the one or more instant messages.

4. The computer-implemented method of claim 1, wherein the context-based criteria is one of a sender-based, a keyword-based, and a timing-based.

5. The computer-implemented method of claim 1, wherein the record is categorized and managed in accordance with a file plan system.

6. The computer-implemented method of claim 1, wherein the record is stored in accordance with a compliance control policy.

7. The computer-implemented method of claim 6, wherein the compliance control policy is based on an event trigger.

* * * * *